Patented Mar. 9, 1954

2,671,808

UNITED STATES PATENT OFFICE 2,671,808

PROCESSES FOR PREPARING POLYCYCLIC
α,β-UNSATURATED KETONES

Eileen L. Johnston, Bernardsville, and Frederick W. Holly, Cranford, N. J., assignors to Merck & Co., Inc., Rahway, N. J., a corporation of New Jersey No Drawing. Application June 23, 1951,
Serial No. 233,265

The portion of the term of the patent subsequent to November 11, 1969, has been disclaimed and dedicated to the public 9 Claims. (Cl. 260—586)

This invention is concerned generally with novel processes for preparing cyclic α,β-unsaturated ketones. More particularly, it relates to an improved method, characterized as being carried out under aqueous conditions, whereby cyclic ketones are condensed with methyl vinyl ketone to produce the corresponding polycyclic α,β-unsaturated ketone.

One established general method applicable for the synthesis of polycyclic α,β-unsaturated ketones is the procedure reported by Du Feu, McQuillin and Robinson in J. Chem. Soc. 1937, page 53. In this procedure disclosed by Robinson et al., the cyclic ketone is ordinarily reacted with methyl vinyl ketone (or with a substance capable of ready decomposition with the formation of methyl vinyl ketone) under anhydrous conditions utilizing an anhydrous organic solvent and an anhydrous alkaline condensation agent such as sodamide, sodium ethoxide, sodium isopropoxide, and the like. This reaction, where the cyclic ketone, cyclohexanone, is utilized as starting material, may be chemically represented as follows:

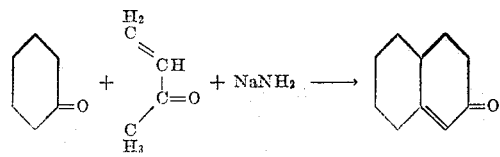

One disadvantage of this prior method is that it is carried out under anhydrous conditions which are objectionable in commercial manufacturing operations. Moreover, the alkaline condensation agents, such as the alkali metal alcoholates or sodamide, previously considered essential in the Robinson reaction, are expensive and must be prepared utilizing metallic sodium which is costly, and hazardous when used industrially. In view of this difficulty, the Robinson method has heretofore been looked upon as a laboratory procedure, and not as a process adapted for commercial manufacturing operations.

We have now discovered that cyclic ketones can be condensed with methyl vinyl ketone (or substances capable of ready decomposition with the formation of methyl vinyl ketone) utilizing instead of the costly and hazardous-to-prepare alkali metal alcoholates or sodamide heretofore considered essential as alkaline condensation agents for carrying out this condensation reaction, the readily available and inexpensive alkali metal hydroxides or quaternary ammonium hydroxides. Moreover, we have discovered that, when an alkali metal or quaternary ammonium hydroxide is used as the alkaline condensation agent, it is not necessary to employ the anhydrous reaction media previously considered mandatory in this type of condensation reaction. Instead, we can employ aqueous media and, surprisingly enough, our improved aqueous modification of the Robinson procedure results in the formation of the desired polycyclic α,β-unsaturated ketone in a yield equal to or greater than that obtainable according to the prior art anhydrous method.

As starting material in our improved process we utilize a cyclic ketone, for example a monocyclic-cyclohexanone compound such as 2-methyl-cyclohexanone and the like, a bicyclic-cyclohexanone compound such as 1-methyl-2-keto - 5-methoxy-1,2,3,4-tetrahydronaphthalene, 1 - methyl-2-keto-5-hydroxy-8-methoxy-1,2,3,4-tetrahydronaphthalene, and the like. The condensation reaction is carried out by bringing into intimate contact the cyclic ketone, methyl vinyl ketone, and a reaction medium containing the alkaline condensation catalyst, and heating the resulting mixture thereby forming the corresponding polycyclic α,β-unsaturated ketone.

If desired, methyl vinyl ketone per se can be incorporated in the reaction medium. In view of the fact that α,β-unsaturated ketones such as methyl vinyl ketone readily polymerize in the presence of catalysts, it is ordinarily preferred to bring together, in the alkaline medium, the cyclic ketone and a methyl β-substituted-ethyl ketone compound characterized as being decomposed by alkaline media with the formation of methyl vinyl ketone. Amongst the methyl β-substituted-ethyl ketone compounds which we ordinarily utilize, in the aqueous alkaline medium, for generating methyl vinyl ketone, in situ, are those which may be chemically represented by the following structural formula: $CH_3COCH_2CH_2Z$, wherein the radical Z may be $R_2N-$, $RS-$, $RSO-$, $RSO_2-$, $RO-$ or X, the radical R being an alkyl or aryl substituent and X being a halo radical. We prefer to utilize the tertiary amines, $CH_3COCH_2CH_2NR_2$, wherein R has the significance hereinabove defined, and quaternary salts thereof, and particularly the 4-dialkylamino-butanone-2-alkyl halides such as diethylamino-butanone-2 methiodide, and the like.

We ordinarily utilize, as the alkaline condensation agent, an alkali metal hydroxide such as sodium hydroxide, potassium hydroxide, a quaternary ammonium hydroxide such as benzyltrimethyl ammonium hydroxide, choline, and the like.

Although our improved process employing alkali metal hydroxide or a quaternary ammonium hydroxide as the alkaline condensation agent can be carried out utilizing anhydrous reaction media, for example, lower aliphatic alcohols such as ethyl alcohol, methyl alcohol, and the like, it is a feature of our process, as set forth hereinabove that anhydrous reaction media need not be employed. Thus, we ordinarily prefer to utilize as the medium for the reaction, water or an aqueous aliphatic alcohol such as aqueous methanol, aqueous ethanol, aqueous isopropanol, and the like.

The reaction is preferably conducted in the absence of air to minimize oxidation of the reactants; this is conveniently accomplished by carrying out the reaction in an atmosphere of nitrogen. The reactants, i. e. the cyclic ketone and methyl vinyl ketone (or methyl β-substituted-ethyl ketone), and the reaction medium containing the alkali metal hydroxide or quaternary ammonium hydroxide are ordinarily brought together in the cold, preferably at a temperature between about 0 and 5° C., and the resulting mixture is maintained at this temperature for approximately one to two hours. The mixture is then heated at an elevated temperature preferably between about 70 and 100° C. for a sufficient time to complete the condensation reaction which is usually complete in about one-half hour.

The polycyclic α,β-unsaturated ketone thus produced, such as 2-keto-2,3,4,5,6,7,8,10-octahydronaphthalene, 2 - keto-10-methyl-2,3,4,5,6,7,8,10-octahydronaphthalene, 1-hydroxy-4-methoxy-7-keto-13-methyl-5,6,7,9,10,13 - hexahydrophenanthrene, 1-methoxy-7-keto-13-methyl-5,6,7,9,10,13-hexahydrophenanthrene, and the like, is conveniently recovered from the reaction mixture by cooling the mixture to a temperature of about 0–5° C., acidifying the mixture with an aqueous solution of a mineral acid, and allowing the aqueous acidic reaction mixture to stand in the cold, whereupon the desired product often crystallizes and can be recovered by filtration. Where the polycyclic α,β-unsaturated ketone fails to crystallize under these conditions, it is conveniently recovered by extracting the aqueous acidic reaction mixture with a water-immiscible organic solvent such as ether. The desired polycyclic α,β-unsaturated ketone is obtained from the extract by evaporating the solvent and can be purified, if desired by conventional means.

The following examples illustrate methods of carrying out the present invention, but it is to be understood that these examples are given for purposes of illustration and not of limitation.

*Example 1*

Three and one-half grams of diethylamino-butanone-2 were swirled in a 500 ml., three-necked flask, and the flask cooled in ice while adding thereto, portionwise, 3.5 g. of methyl iodide over a period of one-half hour. The swirling of the reactants was regulated to obtain a crystalline 4-diethylamino-butanone-2 methiodide on the walls of the flask. The flask containing the reaction mixture was kept in ice for a period of one and one-half hours, the crystalline product adhering to the walls of the flask was washed with three 10 cc.-portions of dry ether and the residual ether was evaporated from the flask in vacuo. The flask was equipped with a stirrer, a nitrogen inlet and a dropping funnel. Five grams of 1-methyl-5-hydroxy-8-methoxy-tetralone-2 and 50 ml. of anhydrous ethanol were added to the flask containing the 4 - diethylamino-butanone - 2 methiodide. Dry nitrogen was introduced into the flask to expel the air, and a solution containing 5.6 g. of potassium hydroxide dissolved in 50 ml. of ethanol (through which nitrogen had been bubbled) was added to the mixture contained in the flask, said addition being carried out over a five-minute period while continually introducing nitrogen into the flask, and stirring and cooling the flask contents. The resulting mixture was stirred at a temperature of approximately 0° C. for an additional period of one and one-half hours. The mixture was then heated under reflux for approximately thirty minutes, the reaction solution was cooled to about 0–5° C., 100 cc. of 2N sulfuric acid was added to the chilled reaction mixture, and the nitrogen stream was discontinued. Two hundred milliliters of water were then added to the acidified reaction mixture, and the resulting aqueous mixture was chilled overnight and then extracted with ether. The insoluble crystalline material was recovered by filtration, washed thoroughly with water, and dried in vacuo to give 1.3 g. of crude 1-hydroxy-4-methoxy-7-keto-13-methyl - 5,6,7,9,10,13 - hexahydrophenanthrene; M. P. 138–139° C. The melting point of a mixture of this product and the starting material was 112–117° C., and the melting point of a mixture of this material with an authentic sample of 1-hydroxy-4-methoxy-7-keto-13 - methyl - 5,6,7,9,10,13 - hexahydrophenanthrene (M. P. 177–178° C.) was 177–178° C.

The water wash was added to the mother liquor, obtained from the filtration of crystalline product described above, and the resulting aqueous solution was extracted with four portions of ether. The combined ether layers were washed with four portions of cold water, and the washed ethereal layers were dried over anhydrous sodium sulfate. The dry ethereal solution was filtered and evaporated almost to dryness in vacuo. The residual material was dissolved in 15 ml. of ether, seeded with 1-hydroxy-4-methoxy-7-keto-13-methyl-5,6,7,9,10,13 - hexahydrophenanthrene, and the resulting mixture was allowed to stand at approximately 0° C. overnight. The crystalline material which precipitated was recovered from the mixture by filtration, washed with a mixture of nine parts of ether to one part of petroleum ether and dried in vacuo to give 1.7 g. of 1-hydroxy-4-methoxy-7-keto-13-methyl-5,6,7,9,10,13 - hexahydrophenanthrene. This product, on heating, sintered at 139° C., resolidified and melted at 173–174° C.

This material was mixed with the crystalline material previously isolated (3.0 g. total) and the mixture was dissolved in 60 ml. of acetone. Activated charcoal (Norite and Darco) was added to the solution, and the resulting mixture was heated to boiling and allowed to stand at room temperature for a period of approximately one-half hour. The mixture was filtered to remove the charcoal, and the charcoal was washed with 10 ml. of acetone. Water was added to the resulting acetone solution, the solution was seeded with 1-hydroxy-4-methoxy-7-keto - 13 - methyl-5,6,7,9,10,13-hexahydrophenanthrene, and the resulting mixture was cooled to approximately 0° C. and allowed to stand until crystallization was substantially complete. The crystalline material was recovered by filtration, washed with a mixture of two parts of water to one part of acetone and dried in vacuo to give 2.1 g. of substantially pure 1-hydroxy-4-methoxy-7-keto-13-methyl-5,6,7,9,10,13- hexahydrophenanthrene;

M. P. 179–180° C. Addition of water to the mother liquor resulted in the precipitation of an additional 0.28 g. of 1-hydroxy-4-methoxy-7-keto-13-methyl-5,6,7,9,10,13 - hexahydrophenanthrene.

*Example 2*

Three and one-half grams of diethylaminobutanone-2 were swirled in a 500 ml., three-necked flask and the flask cooled in ice while adding thereto, portionwise, 3.8 g. of methyl iodide over a period of one-half hour. The swirling of the reactants was regulated to obtain a crystalline 4-diethylamino-butanone-2 methiodide on the walls of the flask. The flask containing the reaction mixture was kept in ice for a period of one and one-half hours, the crystalline product adhering to the walls of the flask was washed with three 10 cc.-portions of dry ether, and the residual ether was evaporated from the flask in vacuo. The flask was equipped with a stirrer, a nitrogen inlet and a dropping funnel. Five grams of 1-methyl-5-hydroxy-8-methoxy-tetralone-2 and 50 ml. of ethanol were added to the flask containing the diethylamino-butanone-2 methiodide. Nitrogen was introduced into the flask to expel the air, and a solution containing 5.6 g. of potassium hydroxide dissolved in 50 ml. of water (through which nitrogen had been bubbled) was added to the mixture contained in the flask, said addition being carried out over a five-minute period while continually introducing nitrogen into the flask, and stirring and cooling the flask contents. The resulting mixture was stirred at a temperature of approximately 0° C. for an additional period of one and one-half hours. The mixture was then heated under reflux for approximately thirty minutes, the reaction solution was cooled to about 0–5° C., 80 cc. of 2N sulfuric acid was added to the chilled reaction mixture, and the nitrogen stream was discontinued. The aqueous acidic reaction mixture was maintained at approximately 0° C. overnight, the insoluble crystalline material was filtered, washed well with ether and water, and dried in vacuo to give 1.0 g. of crude 1-hydroxy-4-methoxy-7-keto-13 ‒ methyl - 5,6,7,9,10,13-hexahydrophenanthrene; M. P. 139–140° C. The melting point of a mixture of this compound with authentic 1-hydroxy-4-methoxy-7 - keto - 13 - methyl-5,6,7,9,10,13-hexahydrophenanthrene (M. P. 177° C.) was 177–178° C.

The filtrate from the crystalline product was diluted with 50 ml. of water and the resulting aqueous solution was extracted with four portions of ether. The combined ether extracts were washed with four portions of cold water, and the washed ethereal solution was dried over anhydrous sodium sulfate, filtered, and the filtered ether solution evaporated almost to dryness in vacuo. The residual material was dissolved in 15 ml. of ether, and the ethereal solution was maintained at approximately 0° C. for about sixty hours. The crystalline material which separated was recovered by filtration, washed with a mixture of nine parts of ether to one part of petroleum ether, and dried in vacuo to give 2.0 g. of 1-hydroxy-4-methoxy-7-keto-13-methyl-5,6,7,9,10,13-hexahydrophenanthrene; M. P. 143° C., resolidified and melted at 176–177° C. The total product isolated (3.0 g.) was dissolved in 70 ml. of acetone, activated charcoal (Norite and Darco) was added to the solution, and the mixture was heated to the boiling point, and then allowed to stand at room temperature for a period of approximately one-half hour. The mixture was filtered to remove the activated charcoal, and the charcoal was washed with acetone. The acetone solution and washings were combined, and 70 ml. of water were added gradually to this acetone solution. The resulting aqueous acetone solution was seeded with 1-hydroxy-4-methoxy-7-keto-13-methyl-5,6,7,9,10,13 - hexahydrophenanthrene and the solution was cooled to approximately 0° C., and allowed to stand until crystallization was substantially complete. The crystalline product which precipitated was recovered by filtration, washed with a mixture of two parts of water to one part of acetone, and dried in vacuo to give 2.2 g. of substantially pure 1-hydroxy-4-methoxy-7-keto-13-methyl-5,6,7,9,10,13-hexahydrophenanthrene; M. P. 180–181° C.

*Example 3*

Three and one-half grams of 4-diethylaminobutanone-2 were swirled in a 500 ml., three-necked flask and the flask cooled in ice while adding thereto, portionwise, 2 ml. of methyl iodide over a period of one-half hour. The swirling of the reactants was regulated to obtain a crystalline 4-diethylamino-butanone-2 methiodide on the walls of the flask. The flask containing the reaction mixture was kept in ice for a period of one and one-half hours, the crystalline product adhering to the walls of the flask was washed with three 10 cc.-portions of dry ether, and the residual ether was evaporated from the flask in vacuo. The flask was equipped with a stirrer, a nitrogen inlet and a dropping funnel. Five grams of 1-methyl-5-hydroxy-8-methoxy-tetralone-2 and 50 ml. of water were added to the flask containing the 4-diethylamino-butanone-2 methiodide. Nitrogen was introduced into the flask to expel the air, and a solution containing 5.6 g. of potassium hydroxide dissolved in 50 ml. of water (through which nitrogen had been bubbled) was added to the mixture contained in the flask, said addition being carried out over a three-minute period while continually introducing nitrogen into the flask, and stirring and cooling the flask contents. The resulting mixture was stirred at a temperature of approximately 0° C. for an additional period of one and three-quarters of an hour. The mixture was then heated at a temperature of 73–93° C. for approximately thirty minutes, the reaction solution was cooled to about 0–5° C., excess 2N sulfuric acid was added to the chilled reaction mixture, and the nitrogen stream was discontinued. The acidic aqueous reaction mixture was cooled to approximately 0–5° C. and the crystalline material which separated was recovered by filtration, washed thoroughly with water and dissolved in ether. The ethereal solution was washed free of acid with water, and the washed ether solution was dried over anhydrous sodium sulfate, filtered and the filtered ethereal solution was evaporated to dryness in vacuo. The residual material was dissolved in 30 ml. of ether, and the ethereal solution was maintained at 0–5° C. overnight. The crystalline material which separated was recovered by filtration, washed with a mixture of nine parts of ether to one part of petroleum ether, and dried in vacuo to give 1.8 g. of 1-hydroxy-4-methoxy-7-keto-13-methyl - 5,6,7,9,10,13 - hexahydrophenanthrene; M. P. 169–170° C.

*Example 4*

Twenty-five and four-tenths grams of 4-diethylamino-butanone-2 were swirled in a round-bottomed flask and cooled by immersing the flask in ice while adding thereto 25.4 g. of methyl iodide, said addition being carried out portionwise during a period of about one-half hour. The swirling was regulated to obtain a crystalline 4-diethylamino-butanone-2 methiodide on the walls of the flask. After the addition of the methyl iodide, the flask and its contents were kept immersed in ice for a period of about one hour, the crystalline material was washed with three portions of dry ether, and the residual ether was evaporated in vacuo. The flask was equipped with a stirrer, nitrogen inlet and a dropping funnel. Twenty and eight-tenths grams of 1-methyl-cyclohexanone and 200 ml. of ethanol were added to the 4-diethylamino-butanone-2 methiodide. The air in the flask was replaced by nitrogen and a solution of 40 g. of potassium hydroxide in 200 ml. of water (through which nitrogen had been bubbled) was added over a seven-minute period while stirring and cooling the flask contents by immersing the flask in ice. The resulting mixture was stirred at a temperature of approximately 0° C. for a period of about one and one-half hours, and was then heated under reflux for about one-half hour. The reaction was then cooled to a temperature of about 0-5° C., and aqueous 2N sulfuric acid solution was added to the cold reaction solution until the pH of the solution was approximately 2. Eight hundred milliliters of water were added to the acidic aqueous reaction mixture, and the mixture was extracted with ether. The ether extracts were combined and the combined extracts were washed thoroughly, first with dilute aqueous sodium bicarbonate solution and then with cold water. The washed ether solution was dried over sodium sulfate, filtered, and the dry ether solution was evaporated to dryness in vacuo. The residual material was fractionally distilled under reduced pressure to give 5 g. of 2-keto-10-methyl - 2,3,4,5,6,7,8,10 - octahydronaphthalene; B. P. 103–113° C./1.5 mm. The 2,4-dinitrophenylhydrazone of this compound was prepared; M. P. 169–170° C.

*Example 5*

Seven grams of 4-diethylamino-butanone-2 were swirled in a one-liter, three-necked flask and cooled by immersing the flask in ice while adding thereto 4 ml. of methyliodide, said addition being carried out portionwise over a period of one-half hour. The swirling was regulated to obtain the diethylamino-butanone-2 methiodide as a crystalline coating on the inside surface of the flask. The flask was kept in ice for a period of one and one-half hours, the 4-diethylamino-butanone-2 methiodide was washed with three 20 ml. portions of dry ether, and the residual ether was evaporated in vacuo. The flask was equipped with a stirrer, a nitrogen inlet and a dropping funnel. Nine and four-tenths grams of 1-methyl-5-methoxy-tetralone-2 and 100 ml. of ethanol were added to the 4-diethylamino-butanone-2 methiodide. The air in the flask was replaced by nitrogen, and a solution of 11.2 g. of potassium hydroxide in 100 ml. of water (through which nitrogen had been bubbled) was added to the flask contents over a five-minute period while stirring and cooling the resulting mixture at a temperature of about 0-5° C. The reaction mixture was stirred at a temperature of approximately 0° C. over a period of about one and one-half hours. The mixture was then heated under reflux for a period of about 30 minutes and was then cooled to 0° C. An aqueous 2N solution of sulfuric acid was added to the resulting mixture until the pH of the solution was approximately 2, and the nitrogen stream was stopped. Four hundred milliliters of water were added to the aqueous acidic reaction mixture, and the resulting mixture was extracted with ether. The ether extracts were combined, and the combined etheral solution was washed with four portions of cold water. The washed etheral solution was dried over anhydrous sodium sulfate and evaporated to a small volume. Petroleum ether was added to the concentrated etheral solution, and the crystalline material which precipitated was separated by filtration, and triturated with ether and dried to give 2.6 g. of 1-methoxy-7-keto-13-methyl - 5,6,7,9,10,13 - hexahydrophenanthrene; M. P. 109–111° C.

The combined mother liquor and washings were evaporated to dryness, and the residual material was fractionally distilled in vacuo. The fraction which distilled at 135-175° C./0.001 mm. was crystallized twice from ether to give an additional 1.6 g. of substantially pure 1-methoxy-7-keto-13- methyl - 5,6,7,9,10,13-hexahydrophenanthrene; M. P. 110–112° C.

Various changes and modifications may be made in carrying out the present invention without departing from the spirit and scope thereof. Insofar as these changes and modifications are within the purview of the annexed claims they are to be considered as part of our invention.

We claim:

1. In the process wherein a cyclic ketone is condensed with methyl vinyl ketone in the presence of an alkaline condensing agent to produce the corresponding polycyclic $\alpha,\beta$-unsaturated ketone, the improvement which comprises utilizing as the alkaline condensing agent a compound selected from the group which consists of alkali metal hydroxides and quaternary ammonium hydroxides, and carrying out the reaction in an aqueous medium.

2. In the process wherein a cyclic ketone is reacted, in the presence of an alkaline condensing agent, with a methyl $\beta$-substituted-ethyl ketone characterized as being decomposed by alkaline media with the formation of methyl vinyl ketone, to produce the corresponding polycyclic $\alpha,\beta$-unsaturated ketone, the improvement which comprises utilizing as the alkaline condensing agent a compound selected from the group which consists of alkali metal hydroxides and quaternary ammonium hydroxides, and carrying out the reaction in an aqueous medium.

3. In the process wherein a cyclic ketone is condensed with methyl vinyl ketone in the presence of an alkaline condensing agent to produce the corresponding polycyclic $\alpha,\beta$-unsaturated ketone, the improvement which comprises utilizing, as the alkaline condensation agent, an alkali metal hydroxide, and carrying out the reaction in an aqueous medium.

4. In the process wherein a cyclic ketone is condensed with methyl vinyl ketone in the presence of an alkaline condensing agent to produce the corresponding polycyclic $\alpha,\beta$-unsaturated ketone, the improvement which comprises utilizing, as the alkaline condensation agent, a quaternary ammonium hydroxide, and carrying out the reaction in an aqueous medium.

5. In the process wherein a cyclic ketone is reacted, in the presence of an alkaline condensing agent, with a methyl $\beta$-substituted-ethyl ketone characterized as being decomposed by alkaline media with the formation of methyl vinyl ketone, to produce the corresponding polycyclic α,β-unsaturated ketone, the improvement which comprises utilizing, as the alkaline condensation agent, an alkali metal hydroxide, and carrying out the reaction in an aqueous medium.

6. In the process wherein a cyclic ketone is reacted, in the presence of an alkaline condensing agent, with a methyl β-substituted-ethyl ketone characterized as being decomposed by alkaline media with the formation of methyl vinyl ketone, to produce the corresponding polycyclic α,β-unsaturated ketone, the improvement which comprises utilizing, as the alkaline condensation agent, a quaternary ammonium hydroxide, and carrying out the reaction in an aqueous medium.

7. The process which comprises reacting 1-methyl-5-hydroxy-8-methoxy-tetralone-2 with diethylamino-butanone-2 methiodide in the presence of an aqueous solution of potassium hydroxide to produce 1-hydroxy-4-methoxy-7-keto-13-methyl-5,6,7,9,10,13-hexahydrophenanthrene.

8. The process which comprises reacting 1-methyl cyclohexanone with diethylamino-butanone-2 methiodide in the presence of an aqueous solution of potassium hydroxide to produce 2-keto-10-methyl-2,3,4,5,6,7,8,10-octahydronaphthalene.

9. The process which comprises reacting 1-methyl-5-methoxy-tetralone-2 with diethylamino-butanone-2 methiodide in the presence of an aqueous solution of potassium hydroxide to produce 1-methoxy-7-keto-13-methyl-5,6,7,9,10,13-hexahydrophenanthrene.

EILEEN L. JOHNSTON.
FREDERICK W. HOLLY.

References Cited in the file of this patent

UNITED STATES PATENTS

| Number | Name | Date |
|---|---|---|
| 2,307,482 | Ballard et al. | Jan. 5, 1943 |
| 2,387,587 | Hunsdiecker | Oct. 23, 1945 |
| 2,617,828 | Sarett et al. | Nov. 11, 1952 |

OTHER REFERENCES

Du Feu et al., J. Chem. Soc., 1937 volume, pages 53–60.

Wilds et al., J. Am. Chem Soc., vol. 65, pages 469–475 (1943).